UNITED STATES PATENT OFFICE.

CARL BOSCH, ALWIN MITTASCH, AND CHRISTOPH BECK, OF LUDWIGSHAFEN-ON-THE-RHINE, GERMANY, ASSIGNORS TO BADISCHE ANILIN & SODA FABRIK, OF LUDWIGS-HAFEN-ON-THE-RHINE, GERMANY, A CORPORATION OF GERMANY.

CATALYZER.

1,211,394.      Specification of Letters Patent.      Patented Jan. 9, 1917.

No Drawing.      Application filed April 8, 1915. Serial No. 20,048.

*To all whom it may concern:*

Be it known that we, CARL BOSCH, ALWIN MITTASCH, and CHRISTOPH BECK, citizens of the German Empire, residing at Ludwigshafen-on-the-Rhine, Germany, have invented new and useful Improvements in Catalyzers, of which the following is a specification.

This invention relates to a new class of catalyzers, which are suitable for oxidation processes, in particular for the oxidation of ammonia to nitrogen oxids.

While the oxygen compounds of bismuth, by themselves, possess only a comparatively small catalytic action, this action is considerably increased by the simultaneous presence of bodies which we call activators. Such bodies may, for themselves, either be of no catalytic action or they may possess such action to a more or less considerable degree, in which cases the catalytic action of the mixture is higher than that of the single components for themselves. The proportions between the oxygen compounds of bismuth and said activators may vary within very wide limits and in certain cases the quantity of the activator may even by far surpass that of the bismuth compounds.

The body acting as activator may either be a compound of a non-metallic element, e. g. of titanium, silicon, or an oxid or other suitable compound of a metal, e. g. of a metal of the iron group, or of another metal, such as copper or magnesium, or a metal itself, e. g. of the platinum group, or a mixture of two or more of the said substances.

The preparation of the new catalyzers may be either effected by mere mixing, or by soaking the one constituent with a solution containing, or yielding the other one, or by coprecipitating, or by calcining mixtures of of salts of the constituents which are decomposed in the heat or by any other suitable way.

The following examples will serve to further illustrate the nature of our invention but the invention is not confined to the examples. The parts are by weight.

Example 1: A solution of 20 parts of bismuth nitrate is, while stirring, mixed with 10 parts of pure, powdered magnesia and with an excess of aqueous ammonia. The precipitate is formed into pieces, dried and heated to red heat.

Example 2: Powdered metallic copper or cupric oxid is kneaded together with freshly precipitated bismuth hydroxid. The mass is formed into pieces and dried by slowly heating to about 600° C. The mass prepared in this way may consist of, e. g., equal parts of cupric oxid and bismuth oxid, but the proportions may be varied.

Example 3: Dissolve a mixture of 45 parts of pure ferric nitrate and from 1 to 2 parts of pure bismuth nitrate, if necessary while adding some pure nitric acid; then precipitate with ammonia, filter, dry the precipitate somewhat, form it into small cubes, and heat slowly. With the aid of this catalyzer, ammonia can be oxidized to form oxids of nitrogen at a temperature of about 700° C. with a yield of 90 per cent. or more. The ferric nitrate, in this example, may wholly or in part be replaced, by salts of other metals of the iron group, for instance by salts of nickel, cobalt, manganese, chromium or uranium, and furthermore binding agents, such as calcium oxid, magnesia or alumina or carriers can be added. Further metallic iron itself or pure iron oxid, or iron hydroxid, can be mixed or coated with a suitable oxygen compound of bismuth.

Example 4: Dissolve 30 parts of cerium ammonium nitrate and 3 parts of bismuth nitrate in water and precipitate with ammonia. Dry a part of the precipitate, grind it with 1 part of calcium oxid and then add the remaining damp part of the precipitate and knead the whole well. Then form it into suitably shaped lumps and dry at 250° C. In this example the cerium ammonium nitrate may be replaced by other cerium salts or by a cerium oxid; or, wholly or in part, by salts or oxids of other rare earth metals, particularly of cerite or yttria earth metals, or of zirconium or thorium. Instead of calcium oxid other binding agents such as magnesia and alumina may be used.

Example 5: Pieces of fire brick are impregnated with a solution of 10 to 20 per cent. of its weight of platinum chlorid and of 10 per cent. of its weight of bismuth nitrate, then the mass is dried and heated.

The platinum or other similar metal may also be first precipitated onto the fire brick, or another carrier, and then the bismuth compound may be added.

What we claim is:

1. An active catalyst suitable for the catalytic oxidation of ammonia to nitrogen oxids comprising an oxygen compound of bismuth and an activator.

2. An active catalyst suitable for the catalytic oxidation of ammonia to nitrogen oxids comprising an oxygen compound of bismuth and an activator which for itself acts as a catalyst for the said reaction.

3. An active catalyst suitable for the catalytic oxidation of ammonia to nitrogen oxids comprising an oxygen compound of bismuth and an oxid of at least one metal of the iron group.

4. An active catalyst suitable for the catalytic oxidation of ammonia to nitrogen oxids comprising the oxids of bismuth, iron and manganese.

In testimony whereof we have hereunto set our hands in the presence of two subscribing witnesses.

CARL BOSCH.
ALWIN MITTASCH.
CHRISTOPH BECK.

Witnesses:
ARTHUR DENONVILLE,
C. INNESS BROWN.